(12) United States Patent
Singh

(10) Patent No.: US 10,496,611 B1
(45) Date of Patent: Dec. 3, 2019

(54) METHOD AND SYSTEM FOR FILE NAME BASED COMMAND EXECUTION IN A STORAGE SYSTEM

(71) Applicant: EMC Corporation, Hopkinton, MA (US)

(72) Inventor: Pranay Singh, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 399 days.

(21) Appl. No.: 14/664,618

(22) Filed: Mar. 20, 2015

(51) Int. Cl.
*G06F 16/185* (2019.01)

(52) U.S. Cl.
CPC ................. *G06F 16/185* (2019.01)

(58) Field of Classification Search
None
See application file for complete search history.

(56) References Cited

U.S. PATENT DOCUMENTS

| | | | | |
|---|---|---|---|---|
| 5,201,044 A * | 4/1993 | Frey, Jr. | ............ | G06F 11/1471 714/16 |
| 5,664,186 A * | 9/1997 | Bennett | ............ | G06F 11/1448 |
| 5,802,312 A * | 9/1998 | Lazaridis | ............ | H04L 69/329 709/202 |
| 7,809,762 B1 * | 10/2010 | Parker | ............ | G06F 17/30377 707/802 |
| 8,006,241 B2 * | 8/2011 | Dias | ............ | G06F 8/61 717/173 |
| 8,145,686 B2 * | 3/2012 | Raman | ............ | G06F 17/30008 707/703 |
| 8,417,667 B1 * | 4/2013 | Lefevre | ............ | G06F 17/30144 707/609 |
| 8,442,952 B1 * | 5/2013 | Armangau | ........ | G06F 17/30159 706/14 |
| 2004/0167984 A1 * | 8/2004 | Herrmann | ............... | H04L 63/08 709/229 |
| 2005/0234951 A1 * | 10/2005 | MacCormick | .... | G06F 17/30091 |
| 2010/0082534 A1 * | 4/2010 | Sagar | ............... | G06F 17/30174 707/610 |
| 2013/0046801 A1 * | 2/2013 | Chandler | .......... | G06F 17/30115 707/822 |
| 2013/0332996 A1 * | 12/2013 | Fiala | ....................... | G06F 21/53 726/4 |
| 2016/0117341 A1 * | 4/2016 | Zhang | ................. | G06F 3/04842 715/704 |

* cited by examiner

*Primary Examiner* — Mark D Featherstone
*Assistant Examiner* — Ranjit P Doraiswamy
(74) *Attorney, Agent, or Firm* — Womble Bond Dickinson (US) LLP

(57) ABSTRACT

In one embodiment, a method implementing file name based command execution is disclosed. The method includes periodically examining a predetermined file directory in a storage system to determine if the predetermined file directory contains any file. The method includes, upon finding a first file, determining that a file name of the first file includes one or more commands of a plurality of preconfigured commands executable in the storage system. The method includes executing the one or more commands included in the file name of the first file to perform one or more actions associated with the one or more commands. The method further includes creating a second file in the predetermined file directory, indicating that the included one or more commands are being executed. The method further includes that, upon that the one or more included commands finish execution, removing the first and second file from the predetermined file directory.

16 Claims, 9 Drawing Sheets

| Command types | Actions |
|---|---|
| rmfh:XXXX | Remove file handle at XXXX |
| lstopq:XXXX | List opaque entry of a file system namespace tree named XXXX |
| rmopq:XXXX | Remove an opaque entry of a file system namespace tree named XXXX |
| rmsnap:XXXX:YYYY | Remove a snapshot named XXXX of a file system namespace tree named YYYY |
| Dbglogonfn:XXXX | Enable the printing of messages in a function named XXXX |
| Dbglogofffn:XXXX | Disable the printing of messages in function named XXXX |
| dmplocks:XXXX | Dump all the locks held by a particular lock file named XXXX |
| dmplockstat:XXXX:YYYY | Dump the statistics of a lock named XXXX at the time interval of YYYY seconds |

FIG. 6

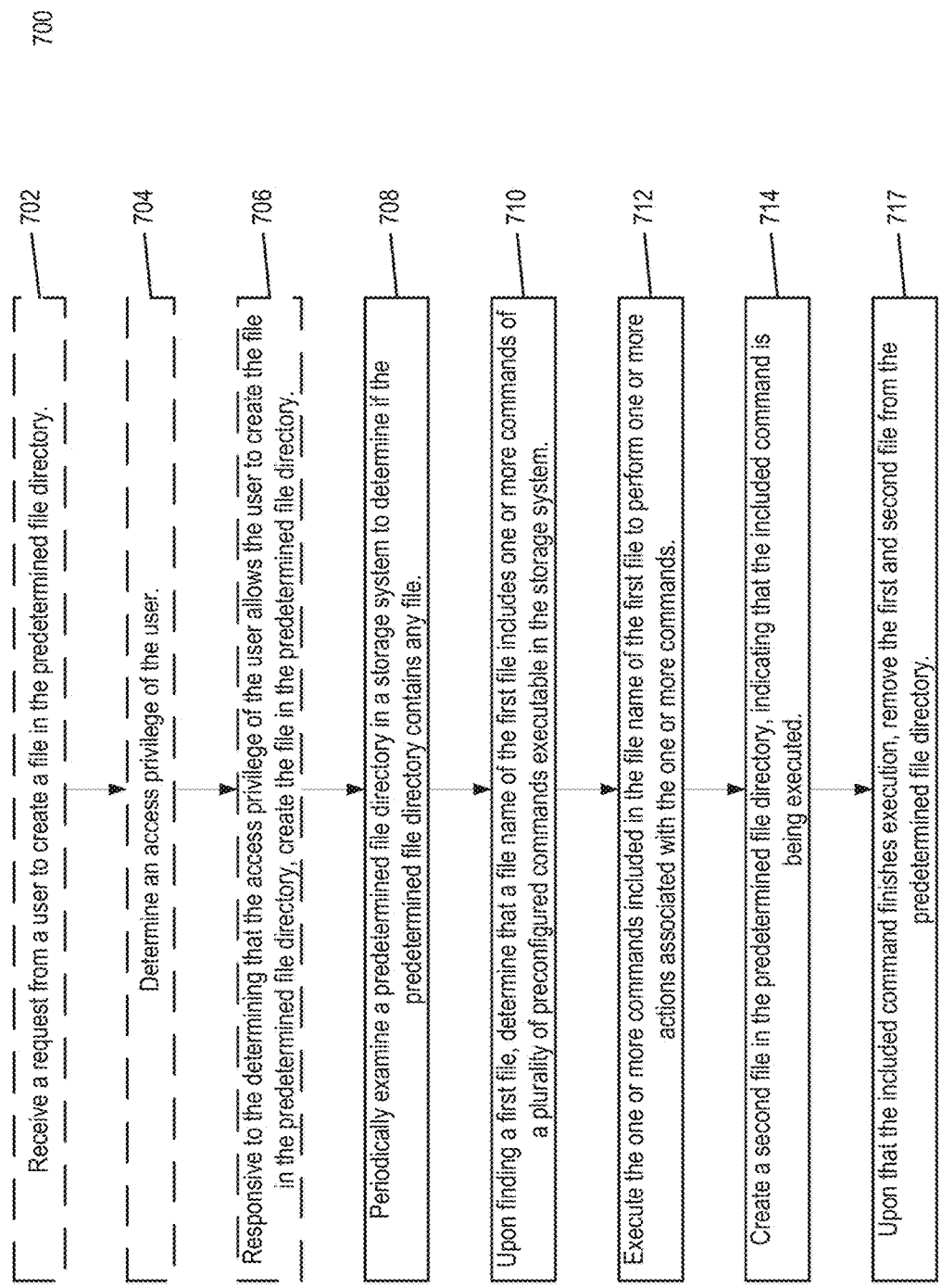

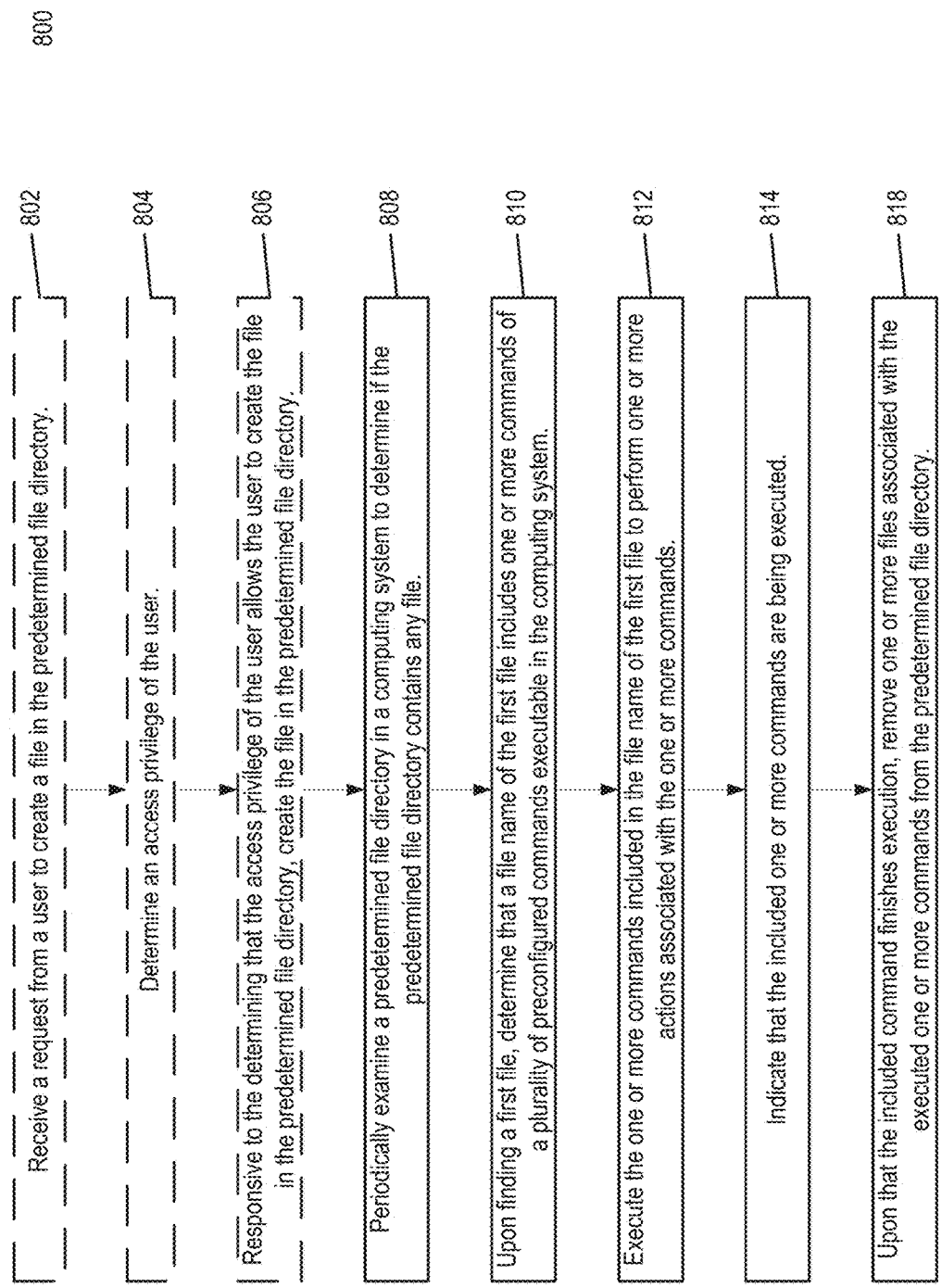

METHOD AND SYSTEM FOR FILE NAME BASED COMMAND EXECUTION IN A STORAGE SYSTEM

FIELD OF THE INVENTION

Embodiments of the present invention relate generally to file system maintenance. More particularly, embodiments of the invention relate to file system maintenance using file name based command execution.

BACKGROUND

Maintaining file systems in a computing device often requires taking the computing device offline. For example, when an administrator removes an entry of a file system tree of the computing device, the computing device needs to be taken offline so that no user of the computing device may have access to the file system. The maintenance of file systems generally not only requires the computing device to be taken offline, it also requires updating user interfaces for the administrator to perform the maintenance operations. Taking the computing device offline can be expensive and impact the user's business, and having user interfaces updated for file system maintenance activities, while convenient for the administrator, can be time consuming and complex to build and keep them up to date.

BRIEF DESCRIPTION OF THE DRAWINGS

Embodiments of the invention are illustrated by way of example and not limitation in the figures of the accompanying drawings in which like references indicate similar elements.

FIG. 6 illustrates a data structure for interpreting commands embedded in a file name according to one embodiment of the invention.

FIG. 7 is a flow diagram illustrating a method of file name based command execution in a storage system according to one embodiment of the invention.

FIG. 8 is a flow diagram illustrating a method of file name based command execution in a computing device according to one embodiment of the invention.

DETAILED DESCRIPTION

Figure 1:
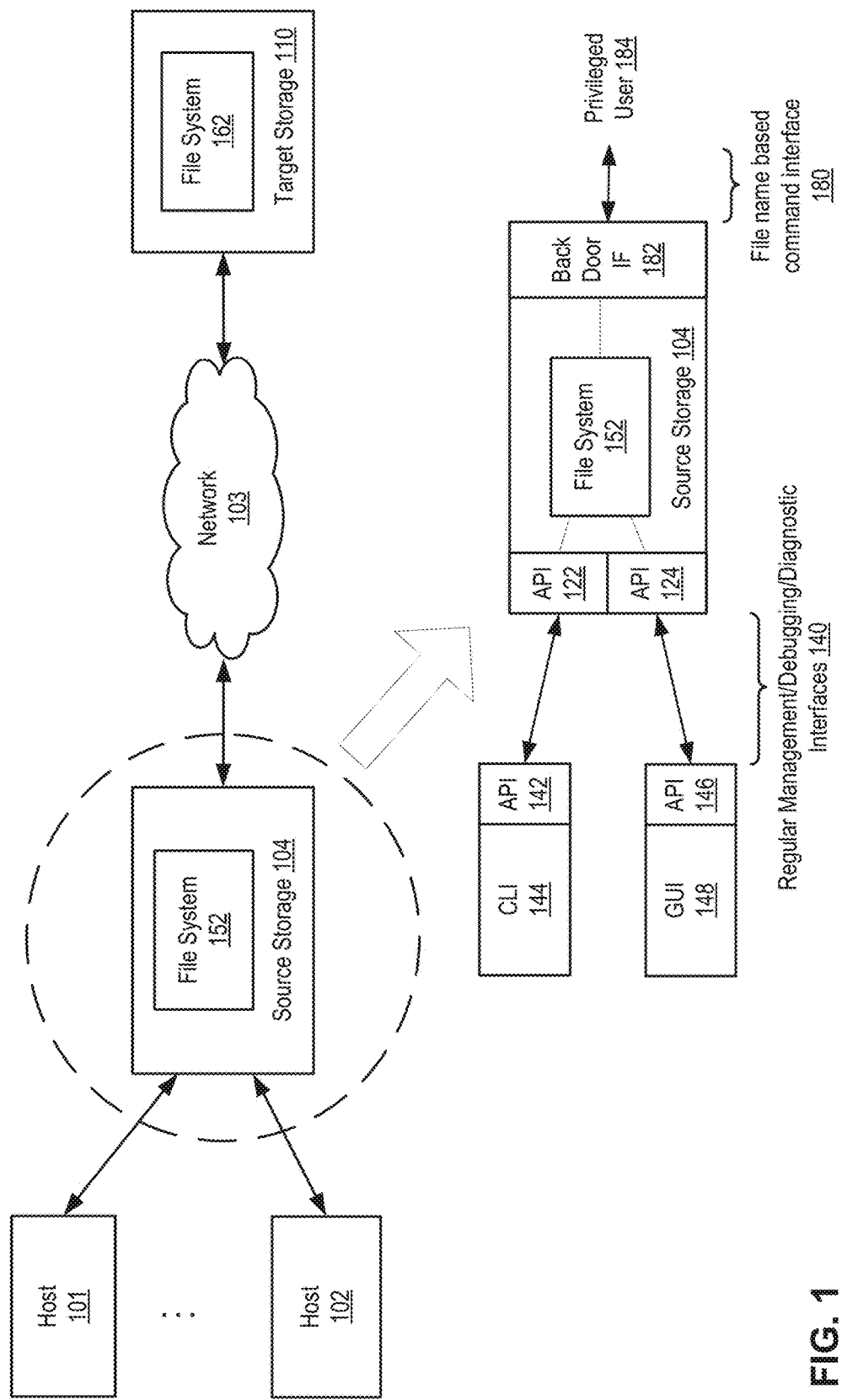
FIG. 1 is a block diagram illustrating a system in which file name based command execution is performed according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

A computer-implemented method is disclosed. The method includes periodically examining a predetermined file directory in a storage system to determine if the predetermined file directory contains any file. The method includes, upon finding a first file, determining that a file name of the first file includes one or more commands of a plurality of preconfigured commands executable in the storage system. The method further includes executing the one or more commands included in the file name of the first file to perform one or more actions associated with the one or more commands. The method further includes creating a second file in the predetermined file directory, indicating that the included one or more commands are being executed. The method further includes that, upon that the one or more included commands finish execution, removing the first and second file from the predetermined file directory.

A storage system is disclosed. The storage system periodically examines a predetermined file directory in the storage system to determine if the predetermined file directory contains any file. Upon finding a first file, the storage system determines that a file name of the first file includes one or more commands of a plurality of preconfigured commands executable in the storage system. The storage system executes the one or more commands included in the file name of the first file to perform one or more actions associated with the one or more commands, and creates a second file in the predetermined file directory, indicating that the included one or more commands are being executed. Upon that the one or more included commands finish execution, the storage system removes the first and second file from the predetermined file directory.

A non-transitory computer-readable storage medium is disclosed. The non-transitory computer-readable storage medium has instructions stored therein, which when executed by a processor, cause the processor to perform operations. The operations include periodically examining a predetermined file directory in a storage system to determine if the predetermined file directory contains any file. The operations include, upon finding a first file, determining that a file name of the first file includes one or more commands of a plurality of preconfigured commands executable in the storage system. The method further includes executing the one or more commands included in the file name of the first file to perform one or more actions associated with the one or more commands. The method further includes creating a second file in the predetermined file directory, indicating that the included one or more commands are being executed. The method further includes that, upon that the one or more included commands finishes execution, removing the first and second file from the predetermined file directory.

Architecture of A Storage System

FIG. 1 is a block diagram illustrating a system in which file name based command execution is performed according to one embodiment of the invention. Referring to FIG. 1, system 100 includes, but is not limited to, one or more hosts 101-102 communicatively coupled to source storage system 104 and target storage system 110 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both source storage system 104 and target storage system 110 may represent any type of server or cluster of servers. For example, source storage system 104 and target storage system 110 may be a storage server used for any of various different purposes, such as to provide multiple users with access to shared data and/or to back up mission critical data. Source storage system 104 and target storage system 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 and target storage system 110 may have a distributed architecture, or all of its components may be integrated into a single unit. Note source storage system 104 and target storage system 110 may have different replication/restoration performance characteristics even when they have similar architecture. Source storage system 104 is implemented as part of an archive and/or backup storage system such as a deduplicating storage system available from EMC® Corporation of Hopkinton, Mass. Target storage system 110 may also be implemented as a deduplicated storage system in some embodiments.

Source storages 104 and target storage 110 contain file systems 152 and 162 respectively. File system maintenance of source storages 104 and target storage 110 is performed on file systems 152 and 162 respectively. The entities involved in a file system maintenance is illustrated with a zoom-in view of file system 152. For file system maintenance, two types of common user interfaces may be used in a computing device such as source storage system 104, and they are command line interface (CLI) such as CLI 142 and graphic user interface (GUI) such as GUI 148. Each interfaces have an application program interface (API) such as API 142 and 146 respectively to interface with source storage 104. Similarly, source storage 104 contains corresponding APIs such as API 122 and API 124 to interface with the API 142 and API 146 for CLI 144 and GUI 148 respectively. API 122 and API 124 may be used to interact with file system 152 for maintenance activities of the file system. These APIs form the maintenance activities include regular management, debugging, and diagnostic interface 140 as illustrated. CLI 144 and GUI 148 are often built for user friendliness and foolproof to prevent inexperienced user to act as an administrator and causes unmitigable damage to source storage 104. The added nicety often come with complexity that runs counter to the need of a quick diagnostic and repair of the file system. For example, in order to use CLI 144 or GUI 148 for maintenance activities of file system 152, all the APIs at both sides need to be updated: In order to use CLI 144 to support file system maintenance of file system 152, API 142 and API 122 need to be updated; in order to use GUI 148 to support the maintenance activities, API 146 and API 124 need to be updated, which can be time-consuming as each API may contains multiple layers (e.g., CLI 144 may contains shell interface layer, software management system (SMS) layer, and etc.), and each layer may need to be updated for maintenance.

Instead, in one embodiment of the invention, a backdoor interface such as backdoor interface 182 is utilized just for the maintenance activities, and the interface interacts only with a privileged user such as privileged user 184. Privileged user 184 may be a user with an administrator privilege such as a root user. Backdoor interface 182 is only for a privileged user, whose is supposed to know the file system, thus backdoor interface 182 can be built without more complicated protection for the users using CLI 144 and/or GUI 148. The communication between privileged user 184 and backdoor interface 182 is a file name based command interface 180.

File name based command interface utilizes a specific directory apart from the regular directories in file system 152, thus the operations of a file name based command do not interfere the normal operations of file system 152, and the file system is available for accessing by clients (hosts 101 and 102) of source storage 104 while the operations of file name based commands are being executed.

State Machine of File Name Based Command Execution

Figure 2:
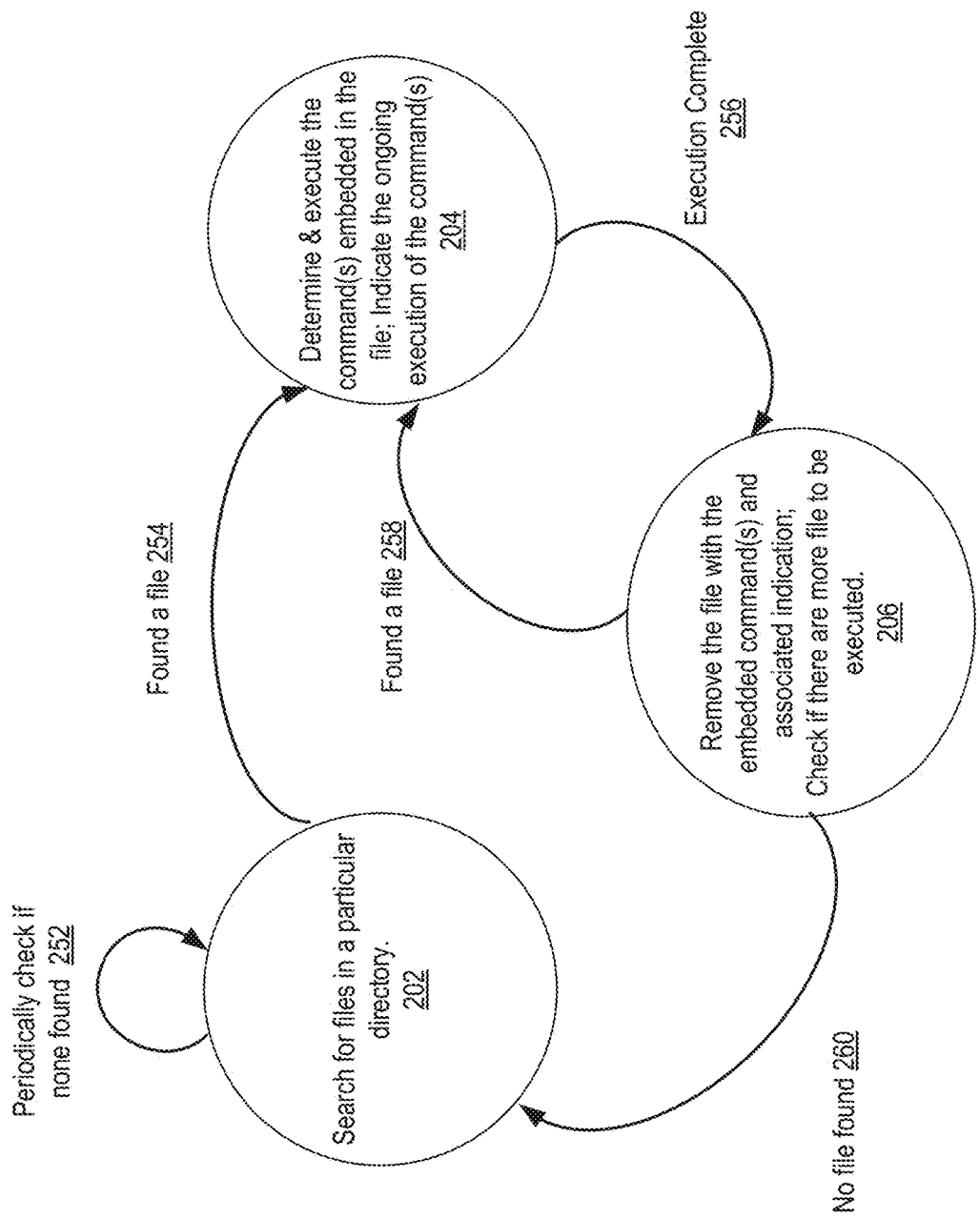
FIG. 2 is a block diagram illustrating a state machine of the operations of file name based commands according to one embodiment of the invention.

FIG. 2 is a block diagram illustrating a state machine of the operations of file name based commands according to one embodiment of the invention. The state machine 200 operates in a computing device (e.g., a storage system such as source storage 104 or destination storage 110). The state machine initiates at state 202, where the computing device searches for files in a particular directory (e.g., /tmp). If the particular directory, which is predetermined by the storage system, does not contain any file, the state machine runs periodical check at reference 252. Once a file is found in the particular directory at reference 254, the state machine goes to state 204. At state 204, the computing device determines whether or not the file name of the file includes one or more commands. The one or more commands belong to a plurality of preconfigured commands executable in the computing device. These preconfigured commands are for maintenance of the file system of the computing device. If the file name does not include the preconfigured commands, the file is ignored or removed from the directory; if the file name includes the preconfigured commands, the computing device executes the command(s) embedded in the file name of the found file. While the one or more commands are being executed, the computing device provides an indication that the ongoing execution of the command(s). Once the execution completes at reference 256, the state machine goes to state 206.

At state 206, the computing device removes the file with the embedded one or more commands and also the associated indication of the execution. At state 206, the computing device also checks if there is any other file in the particular directory. If a file is found at reference 258, the state machine moves back to state 204. If there is no file as determined at reference 260, the state machine goes to state 202.

Example of File Name Based Command Execution

Figure 3:
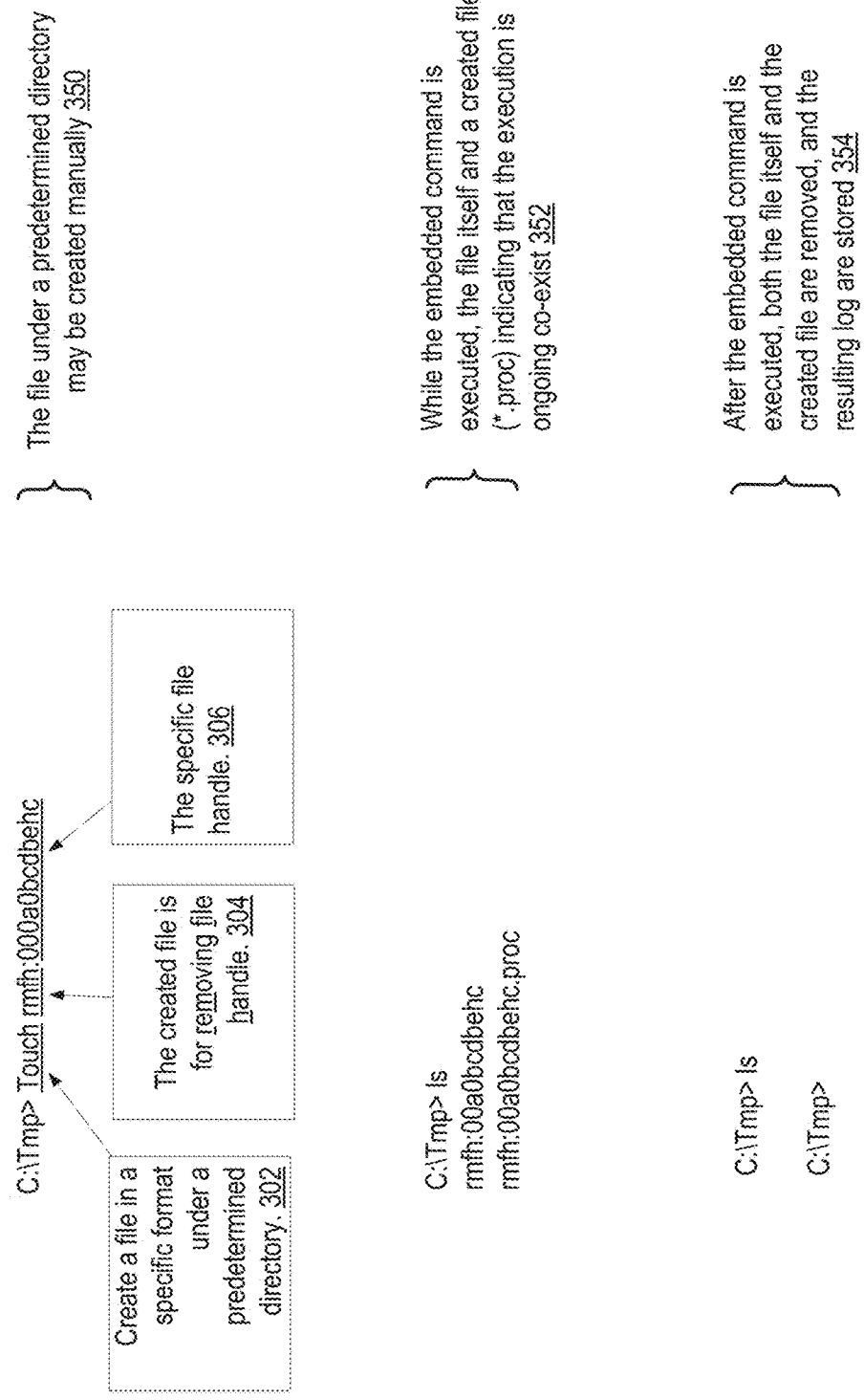
FIG. 3 illustrates an example of file name based command execution according to one embodiment of the invention.

FIG. 3 illustrates an example of file name based command execution according to one embodiment of the invention. A computing device contains file system(s) in need of maintenance including managing operations to detect anomalies, debugging and diagnostics upon detecting the anomalies. At reference 350, a file is created manually under a predetermined directory of the computing device, and the directory is /tmp in this example. The predetermined directory is accessible by a user with a particular privilege only, and it is chosen so that operations based on the file do not interfere with regular operations of the file system. Thus, the predetermined directory is preferably a directory that other operations by the computing device do not use.

At reference 302, a privileged user creates the file under the predetermined directory by entering a command in the command line interface of the computing device. The command is "touch" in this example. The command creates a file with a specific file name under the directory, where the file name may be parsed by the computing device. In this example, the file name contains two parts: rmfh and 000a0bcdbehc. The former specifies an operation to be performed, which is to remove a file identified by a file handle as illustrated at reference 304; and the latter specifies the details of the file handle at reference 306. The file name may include one or more commands, and examples of the commands are discussed in more details herein below.

The computing device parses the file name of the created file (rmfh:000a0bcdbehc in this example), and extracts the embedded one or more commands in the file name. In this example, the extracted includes both the command rmfh and its parameter 000a0bcdbehc. From checking with a data structure that interprets the one or more commands (discussed in more details herein below), the computing device interprets the one or more commands, and performs the one or more actions associated with the one or more commands based on the interpretation of the data structure. In this example, the one or more actions include removing the file handle at 000a0bcdbehc.

While the computing device executes the embedded one or more commands in the file name (e.g., performing the one or more actions associated with the one or more commands), it indicates that the embedded one or more commands are being executed. In this example, a second file is created under the same directory to indicate the ongoing execution, as illustrated at reference 352. As illustrated, the second file ends with .proc, which is a suffix indicating that another file with the same file name other than the suffix is being executed. Thus, the predetermined directory now has two files, and the difference between the two is that the second file has the .proc suffix. Obviously, a different suffix would work too, and many different ways may indicate the ongoing execution of commands embedded in a file name, for example, instead of a suffix, creating a file with a predetermined prefix would work. In one embodiment, the created file such as rmfh:000a0bcdbehc is a zero byte file and the computing device knows to check only zero byte file for extracting commands. Once the embedded commands are being executed, the computing device may change the size of the file to indicate that the file is in the middle of processing in one embodiment.

Once the execution of the embedded one or more commands finishes, the computing device removes the created file such as rmfh:000a0bcdbehc and the created an indication such as rmfh:000a0bcdbehc.proc at reference 354. Execution of some commands generates logs (e.g., a debugging log), and the log is stored in a predetermined directory. As illustrated at reference 354, once the execution finishes, there is no longer any file under the predetermined directory.

In some embodiments, multiple files such as rmfh: 000a0bcdbehc may be created under the predetermined directory such as /tmp. The computing device may process through all the created files (e.g., through cron thread walk, and a job is spawned for each created file) and the associated indication file such as .proc is created and removed as the corresponding files are processed.

Through performing maintenance activities by executing the commands embedded in file names, the computing device may perform the maintenance activities quickly with a minimum impact on the availability of the computing device. The computing device may stay online and its file system may be accessed by clients of the computing device during the execution of the commands. Thus, the lightweight approach for maintenance is efficient and causes a minimum impact to the computing device.

Storage System Implementing File Name Based Command Execution

Figure 4:
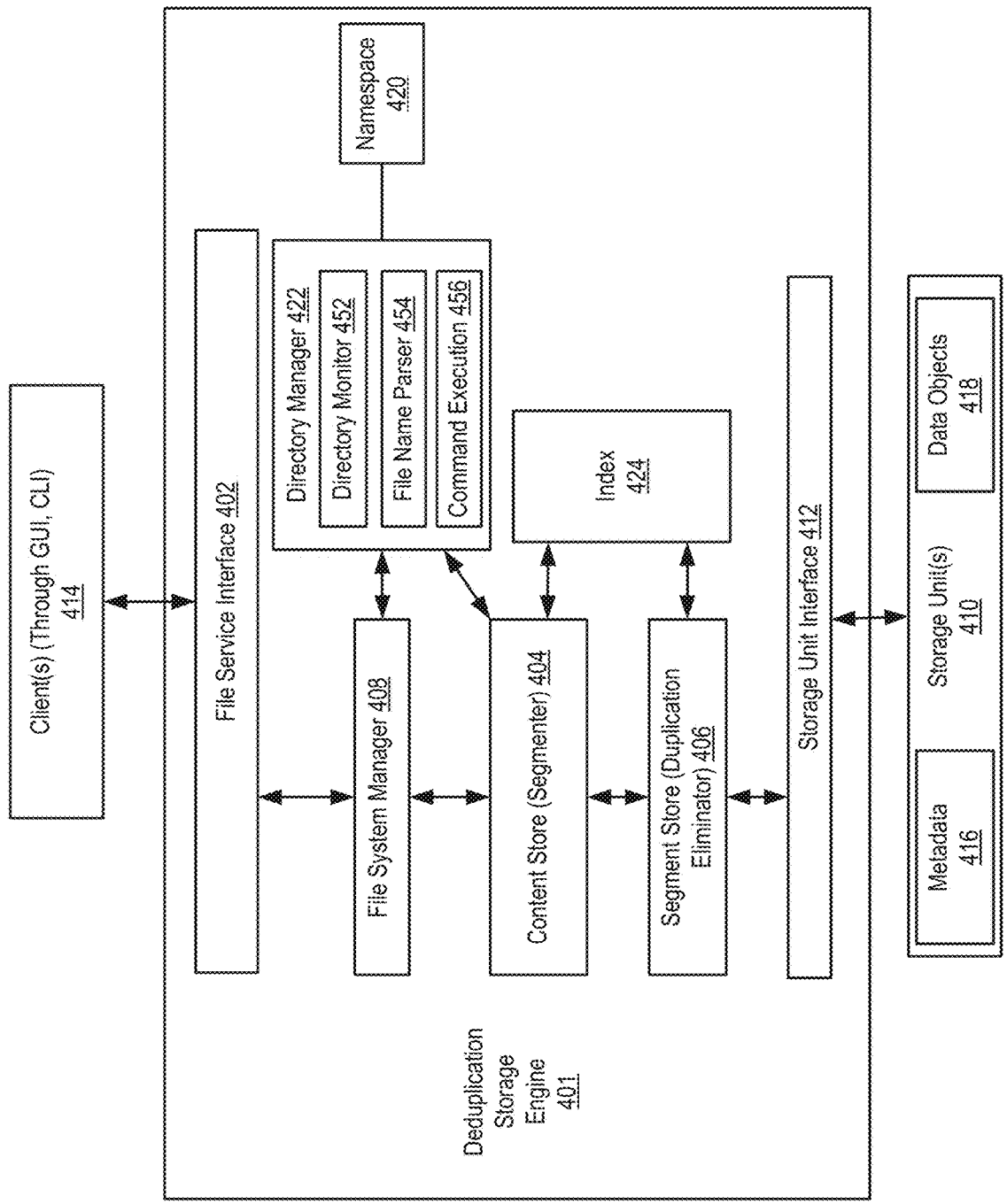
FIG. 4 is a block diagram illustrating a deduplicating storage system according to one embodiment of the invention.

In one embodiment, the file name based command execution is performed in a storage system. Particularly, the storage system may be a deduplicating storage system. FIG. 4 is a block diagram illustrating a deduplicating storage system according to one embodiment of the invention. The deduplicating storage system 400 may be a detailed implementation of source storage system 104 or target storage system 110 illustrated in FIG. 1.

The deduplicating source storage system 400 interfaces one or more clients 414 with one or more storage units 410 storing metadata 416 and data objects 418. Clients 414 may be any kinds of clients, such as, for example, a client application (e.g., from hosts 101/102 of FIG. 1), backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless. Clients 414 may be the backdoor interface 182, which interacts with privileged user 184 in FIG. 1.

Storage units (sometimes referred to as storage devices) 410 may be implemented locally (e.g., single node operating environment) or remotely (e.g., multi-node operating environment) via an interconnect, which may be a bus and/or a network (e.g., a storage network). In one embodiment, one of storage units 410 operates as an active storage to receive and store external or fresh user data from a client (e.g., an end-user client or a primary storage system associated with one or more end-user clients), while the another one of storage units 410 operates as a target storage unit to periodically archive data from the active storage unit according to an archiving policy or scheme. Storage units 410 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 410 may also be combinations of such devices. In the case of disk storage media, the storage units 410 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 416, may be stored in at least some of storage units 410, such that files can be accessed independent of another storage unit. Metadata of each storage unit includes enough information to provide access to the files it contains. In one embodiment, metadata may include fingerprints contained within data objects 418, where a data object represents containers, which contains one or more compression regions (CRs) of one or more data chunks, CRs, or data chunks. Each data chunk is a fragment of data block and data chunks are processed and stored in the deduplicated storage system. Fingerprints are mapped to a particular data object via metadata 416, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 416 may include a file name, a storage unit identifier (ID) identifying a storage unit in which the chunks associated with the file name are stored, reconstruction information for the file using the chunks, and any other appropriate metadata information. Metadata 416 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 401 includes file service interface 402, file system manager 408, content store 404, segment store 406, directory manager 422, namespace 420, index 424, and storage unit interface 412. Deduplication storage engine 401 receives a file or files (or data item(s)) via file service interface 402, which may be part of a file system namespace 420 of a file system associated with the deduplication storage engine 401. The file system namespace 420 is managed by directory manager 422. File service interface 402 supports a variety of protocols, including a network file system (NFS), a common Internet file system (CIFS), and a virtual tape library interface (VTL), etc.

The file(s) is/are processed by content store 404 and file system manager 408. Content store 404, also referred to as a segmenter, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based-for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system manager 408, also referred to as a file system control module, processes information to indicate the chunk(s) association with a file. In some embodiments, a list of fingerprints is used to indicate chunk(s) associated with a file. File system manager 408 passes chunk association information (e.g., representative data such as a fingerprint) to index 424. Index 424 is used to locate stored chunks in storage units 410 via storage unit interface 412. Segment store 406, also referred to as a duplication eliminator, identifies whether a newly received chunk has already been stored in storage units 410. In the event that a chunk has already been stored in storage unit(s), a reference to the previously stored chunk is stored, for example, in a segment tree associated with the file, instead of storing the newly received chunk. A segment tree of a file may include one or more nodes and each node represents or references one of the deduplicated chunks stored in storage units 410 that make up the file. Chunks are then packed by a container manager (which may be implemented as part of storage unit interface 412) into one or more storage containers stored in storage units 410. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 402 is configured to communicate with file system manager 408 to identify appropriate chunks stored in storage units 410 via storage unit interface 412. Storage unit interface 412 may be implemented as part of a container manager. File system manager 408 communicates (e.g., via content store 404) with index 424 to locate appropriate chunks stored in storage units via storage unit interface 412. Appropriate chunks are retrieved from the associated containers via the container manager and are used to construct the requested file. The file is provided via file service interface 402 in response to the request. In one embodiment, file system manager 408 utilizes a segment tree (e.g., a segment/segment tree obtained from namespace 420) of content-based identifiers (e.g., fingerprints) to associate a file with data segments/chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 401 may be implemented in software (e.g., executable code executed in a memory by a processor), hardware (e.g., processor(s)), or a combination thereof. For example, deduplication engine 401 may be implemented in a form of executable instructions that can be stored in a non-transitory machine-readable storage medium, where the instructions can be executed in a memory by a processor.

In one embodiment, deduplicating storage system 400 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In the illustrated embodiment, directory manager 422 contains directory monitor 452, file name parser 454, and command execution 456 to support file name based command execution. Directory monitor is to periodically examine a predetermined file directory in storage system 400 to determine if the predetermined file directory contains any file. Upon finding a file, file name parser 454 determines that a file name of the file includes one or more commands of a plurality of preconfigured commands executable in the storage system. If the file name includes the one or more commands, command execution 456 executes the one or more commands included in the file name of the file to perform one or more actions associated with the one or more commands. The execution is performed through parsing the file name of the file; extracting the one or more commands from the file name; looking up a data structure to interpret the extracted one or more commands; and performing one or more actions associated with the one or more commands based on the data structure. In one embodiment, the execution includes indicating the one or more included commands are being executed (e.g., creating a second file in the predetermined file directory).

In one embodiment, one or more of directory monitor 452, file name parser 454, and command execution 456 are implemented outside of directory manager 422 (e.g., file system manager 408).

File System Namespace Structure and Commands for Maintenance

Embodiments of the invention may apply to file system namespaces of a computing device such as storage system 400. For file system namespaces, as they are a particular type of metadata, additional consideration is required. File system namespace such as namespace 420, is managed by directory manager 422, and it is generally organized as a hierarchical data structure.

Figure 5A:
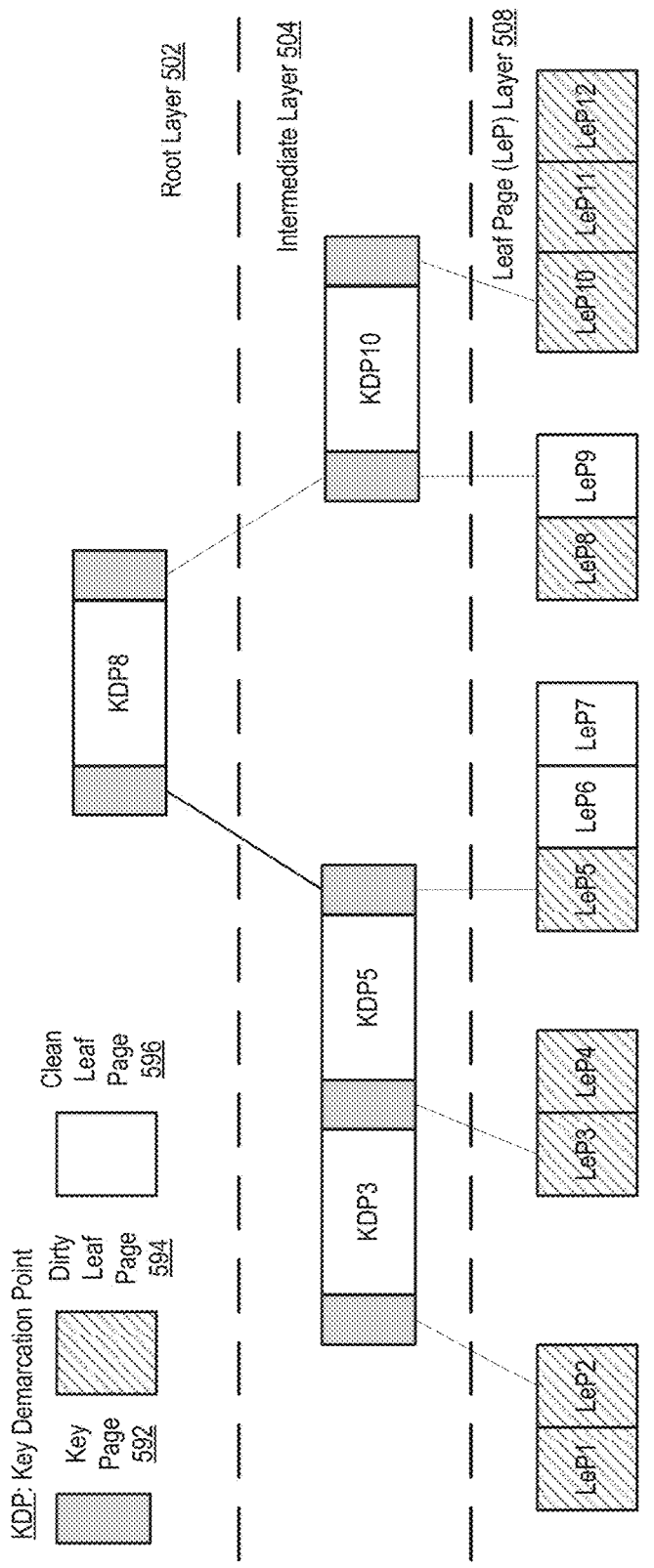
FIG. 5A illustrates a hierarchical data structure of a file system namespace according one embodiment of the invention.

FIG. 5A illustrates a hierarchical data structure of a file system namespace according one embodiment of the invention. The hierarchical layer contains a root layer 502, an intermediate layer 504, and a leaf page layer 508. Each layer contains one or more pages (also referred to as nodes), referred to as root pages, intermediate pages, and leaf pages respectively. While only one intermediate layer is illustrated in the figure, it is to be understood that the hierarchical data structure may contain multiple intermediate layers. In one embodiment, the hierarchical data structure is a B+ tree ("B" stands for Bayer, which was to honor the inventor Rudolf Bayer), although the principal disclosed in the embodiments of the invention may apply to other hierarchical data structure.

When the hierarchical data structure is a B+ tree, the intermediate pages are referred to as internal pages. The B+ tree stores namespace data at leaf pages. Root pages and intermediate pages contain key pages separated by key demarcation points. Each key page contains key entries represented by <key, data> pairs. The key of a <key, data> pair of the root page and internal page is formed by a computation including a parent Mode (index node) and a child Mode, and the data of the <key, data> pair of the root page and internal page points to a page of a lower level.

Within each key page, the key entries are sorted in order. The sorting may be performed through hash of the keys (e.g., producing 64 bits look_up keys for each of the <key, data> pairs). Through sorting, the keys with the same parent Mode are stored together in a key page. Each key page and leaf page are limited in size, thus key pages are separated by key demarcation points (KDPs), which indicates that all the keys with values less than the KDPs are stored at one side of the KDPs, and all the keys with value larger than the KDPs are stored at the other side of the KDPs. For each root node and internal node, there are n+1 key pages if there are n KDPs. KDPs may represent valid key value themselves.

At each leaf page, the <key, data> pair contains the key points to data, which points to a file or a directory of a file system of the storage system. For each file and directory, there are several keys contained in the B+ tree leaf page. One is Mode key (also known as a child key) that has the Mode as the data for the key. The Modes represent file system objects, such as files and directories of a file system of the storage system. Another is name key that has the file name as the data. Yet another is name hash key that has the hash value of the name as the data. The <key, data> pairs at the leaf page are generally referred to as the namespace entries.

Figure 5B:
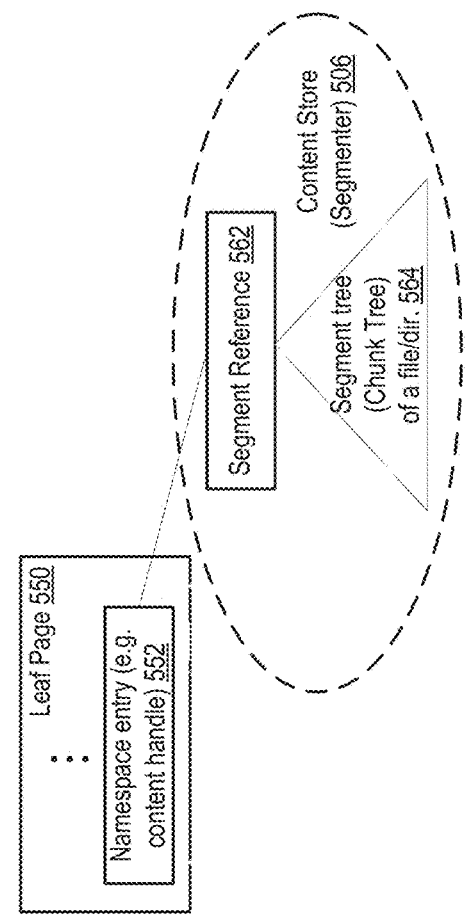
FIG. 5B illustrates a namespace corresponding to data segments of a file system of a storage system according one embodiment of the invention.

FIG. 5B illustrates a namespace corresponding to data segments of a file system of a storage system according one embodiment of the invention. Namespace entries of the hierarchical data structure of a namespace correspond to file systems of a storage system. Leaf page 550 is illustrated as an example. Leaf page 550 contains a number of namespace entries such as namespace entry 552, each contains data corresponding to a file or directory of a file system. For example, the data may be a content handle. A content handle can uniquely identify a file or a directory in the file system. Content handle may contain Mode, parent inode, namespace identifier, and other information.

The content handle points to a segment reference 562, which corresponds to a segment tree of a file/directory 564. The segment reference 562 and segment tree (also known as chunk tree) 564 are within content store 506, which has been discussed herein above. Segment tree 564 contains chunks mapping to data segments of the file/directory. Thus, the hierarchical data structure of a namespace (stored in namespace 420 and interacting with directory manger 422 of FIG. 4) is different from the segment tree 564 (stored in content store 404 and interacting with file system manager 408 of FIG. 4), even though both are hierarchical data structures.

In a file system of a deduplicated storage system, a file may be represented in a tree having one or more levels of segments in a multi-level hierarchy. In one embodiment, there are seven levels L0 to L6, where L6 is the root level, also referred to as a top parent level representing one or more content handles. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as LP segments.

In one embodiment, when accessing a file, a directory manager traverses the namespace represented by the hier- archical data structure described above until it reaches the leaf pages of the hierarchical data structure to obtain a content handle of the file. A container manager or content store manager (not shown) traverses the segment tree associated with the content handle identified by the directory manager, starting from the root level to leaf nodes. For example, the container manager obtains the fingerprints of the root level segments, in this example, L6 segments, as part of content handles. Based on the fingerprints of the current level segments, the container manager, which may be part of a content store manager, can identify which of the containers in which the segments are stored based on indexing information from the index (not shown). The index may be maintained in the system memory (e.g., volatile memory) and/or in a storage device (e.g., non-volatile memory). The index includes information mapping a fingerprint to a storage location that stores a segment represented by the fingerprint. In one embodiment, the index may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on, until it reaches the leaf nodes representing the actual deduplicated segments. Throughout this application, for the purpose of illustration, a container contains one or more compression regions and each compression region contains one or more segments therein. However, the techniques may also be applied to other storage layouts.

Referring back to FIG. 5A, each leaf page contains namespace entries. Each leaf page is limited in size. In one embodiment, each leaf page is 64 kilo bytes (KB). Similar to key pages, the leaf pages are also sorted in order and the namespace entries within a leaf page are also sorted in order. The sorting may be performed through hash of the keys (e.g., producing 64 bits look_up keys for each of the <key, data> pairs). Through sorting, the namespace entries with the same parent Mode are stored together. Thus, the leaf pages 1 and 2 (denoted as LeP1 and LeP2 respectively) contain namespace entries pointed to from the same key page (the key page at the left of KDP3), and the namespace entries within LeP1 are all in orders higher than the namespace entries within LeP2. Similarly, the leaf pages 3 and 4 (denoted as LeP3 and LeP4 respectively) contain namespace entries pointed to from the same key page (the key page at the right of KDP3 and the left of KDP5), and the namespace entries within LeP3 are all in orders higher than the namespace entries within LeP4. However, the namespace entries within LeP3 are all in orders lower than the namespace entries within LeP1 and LeP2. In other words, all the namespace entries of the leaf pages of the leaf page layer 508 are ordered from the highest to the lowest according to their keys. The numbering of LeP and KDP in FIG. 5A with numerical orders indicates the orders of the leaf pages and key pages.

A benefit of B+ tree to store the namespaces of file systems of a storage system is efficient search time. For example, to search a data in one million <key, data> pairs, a balanced binary tree requires about 20 block reads, while a B+ tree requires only about 4 block reads.

Namespace entries and key page entries associated with file systems are updated during operations of the storage system. The updates are not in a predetermined order and depend on the nature of operations. For example, when a directory grows to contain a large number of files and then subsequently removes a substantial portion of the files, the operations generate leaf pages that are substantially full initially and then become sparse or even empty when the files are removed. When a leaf page becomes empty, it will be collected and reused.

For a file system namespace, the combination of the B+ tree and segment tree is referred to as a management tree (or Mtree). The Mtree is associated with a file system namespace. With the hierarchical structures of the file system namespace, the block mapping may provide more information in aiding access to the storage units.

Maintenance of the file system namespace includes operations on the entities of the Mtree. FIG. 6 illustrates a data structure for interpreting commands embedded in a file name according to one embodiment of the invention. The illustrated data structure is a table, but other data structure may work equally well, such as a list, an array, a map, and a rational database. The table contains the following items, each including a command and one or more parameters to be utilized to execute the command:

rmfh:XXXX: Remove a file handle identified by file handle XXXX.

lstopq:XXXX: List the opaque entries of a file system namespace tree (e.g., a Mtree) named XXXX. The opaque entries are in the leaf pages of a B+ tree discussed herein above.

rmopq:XXXX: Remove the opaque entries of a file system namespace tree (e.g., a Mtree) named XXXX. The opaque entries can be the leaf pages of a B+ tree discussed herein above. Sometimes a snapshot of the file system namespace tree has been removed, but some opaque entries remains in the file system namespace (sometimes referred to as snapshot leaking). This file name is for removing the leaked opaque entries.

rmsnap:XXXX:YYYY: Remove a snapshot named XXXX of a file system namespace named YYYY.

Dbglogonfn: Enable the printing of message in a function named XXXX.

Dbglogofffn: Disable the printing of message in a function named XXXX.

dmplocks:XXXX: Dump all the locks held by a particular lock file named XXXX by printing out the types and owners of the locks.

dmplockstat:XXXX:YYYY: Dump the statistics of a lock named XXXX periodically at the interval of YYYY seconds. The command helps for an administrator to know the details of highly contended locks in a file system.

Of course, the data structure for interpreting a command embedded in a file name may include additional and/or different commands. For a giving computing device, the command set is predetermined (although can be updated and/revised later), so that if a file name does not contain only of the command(s) in the predetermined command set, the computing device will ignore the file in the predetermined directory.

Flow Diagrams

FIG. 7 is a flow diagram illustrating a method of file name based command execution in a storage system according to one embodiment of the invention. Method 700 may be performed in a storage system such as source storage 104 or target storage 110 of FIG. 1. The directory manager 422 as illustrated in FIG. 4 performs the operations in one embodiment.

At reference 702, a request from a user to create a first file in a predetermined file directory is received. The user may interact with client(s) 414 to send the request. At reference 704, a determination is made as of the access privilege of the user. If the access privilege of the user allows the user to create the first file in the predetermined file directory, the first file is created in the predetermined directory at reference 706; otherwise the no file is created and an error is returned to the user. In one embodiment, the first file is a zero-byte file.

At reference 708, the storage system periodically examines the predetermined file directory in the storage system to determine if the predetermined file directory contains any file. Upon finding the first file, the storage system determines that a file name of the first file includes one or more commands of a plurality of preconfigured commands executable in the storage system at reference 710. Then at reference 712, the storage system executes the one or more commands included in the file name of the first file to perform one or more actions associated with the one or more commands.

In one embodiment, the execution includes parsing the file name of the first file; extracting the one or more commands from the file name; looking up a data structure to interpret the extracted one or more commands; and performing the one or more actions associated with the one or more commands based on the data structure. The data structure is discussed herein above in relation to FIG. 5, which illustrates an example of the plurality of preconfigured commands include commands manipulating a hierarchical data structure storing namespace of a file system of the storage system. It is to be noted that the file system is available for accessing by clients of the storage system while the plurality of commands are being executed.

At reference 714, the storage system creates a second file in the predetermined file directory, indicating that the included one or more commands are being executed. In one embodiment, the second file is a zero-byte file. At reference 716, upon that the included one or more commands finish execution, the storage system removes the first and second file from the predetermined file directory.

It is to be noted that the predetermined file directory may contains multiple files like the first file, and the storage system may execute them one at a time or execute them concurrently. By checking the number of files under the predetermined file directory (e.g., using an "ls" command in a UNIX like system), an administrator may know the execution status of the commands embedded in the multiple files. Also, a result of executing the command included in the first file is stored in a log file for debugging in one embodiment.

FIG. 8 is a flow diagram illustrating a method of file name based command execution in a computing device according to one embodiment of the invention. Method 800 is similar to method 700, and the difference is highlighted below. One difference is that the operations are performed in a computing device, which includes the storage system discussed in relation to method 700. The other difference is that instead of creating a second file at reference 714, at reference 814, the computing device indicates that the included one or more commands are being executed, and the indication may be not through creating the second file, as discussed in relation to FIG. 3.

Exemplary Computing Device

Figure 9:
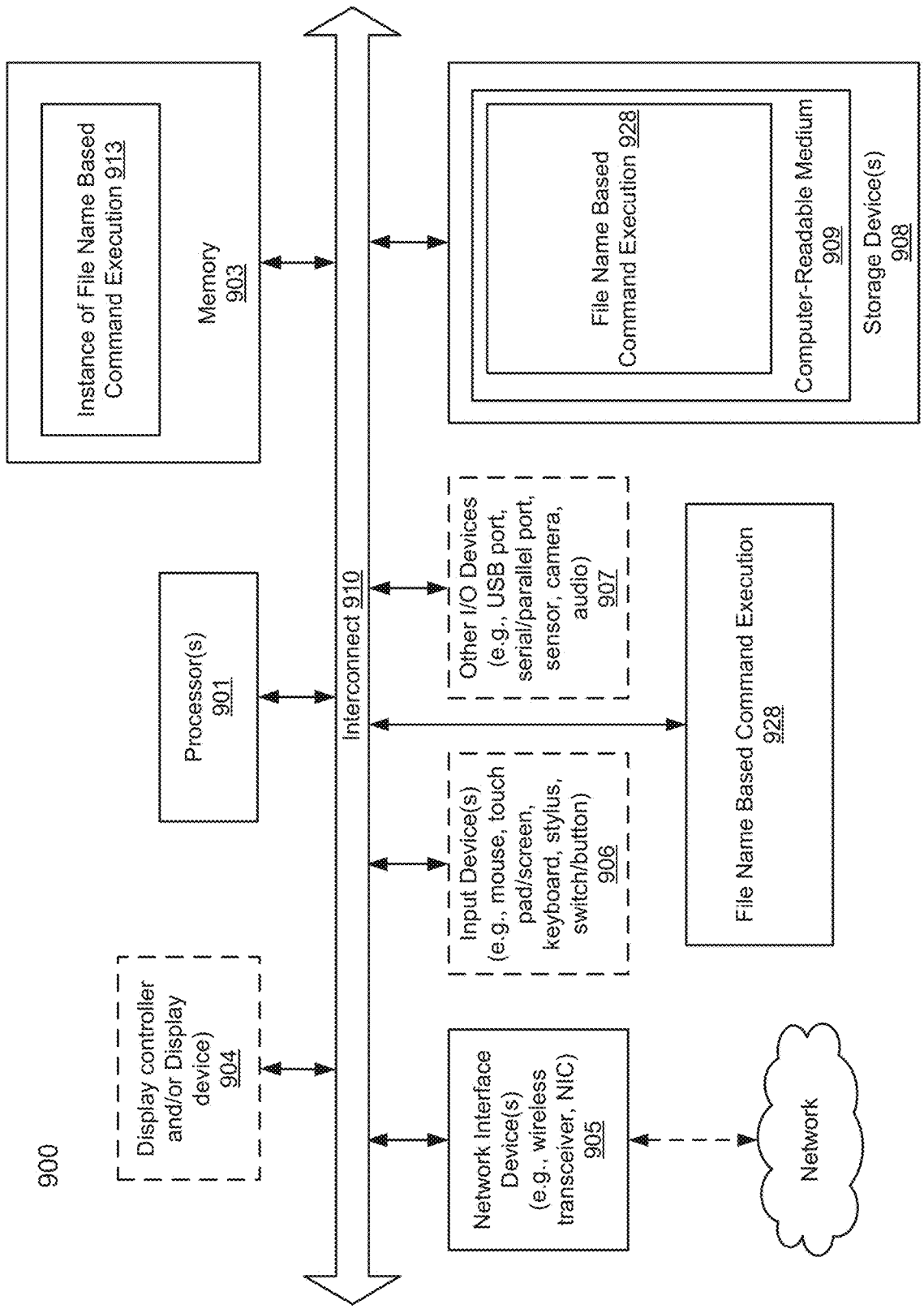
FIG. 9 is a block diagram illustrating an example of a data processing system which may be used with one embodiment of the invention.

FIG. 9 is a block diagram illustrating an example of a data processing system which may be used with one embodiment of the invention. For example, system 900 (e.g., a computing device) may represent any of data processing systems described above performing any of the processes or methods described above. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including a basic input/output software (BIOS) as well as other firmware of the system.

Storage device 908 may include computer-accessible storage medium 909 (also known as a machine-readable storage medium or a computer-readable medium) on which is stored one or more sets of instructions or software (e.g., file name based command execution 928) embodying any one or more of the methodologies or functions described herein. File name based command execution 928 may also instantiate an instance 913 reside, completely or at least partially, within memory 903 and/or within processor 901 during execution thereof by data processing system 900, memory 903 and processor 901 also constituting machine-accessible storage media. File name based command execution 928 may further be transmitted or received over a network via network interface device 905.

Computer-readable storage medium 909 may also be used to store persistently the some software functionalities described above that execute file name based commands. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

File name based command execution 928, components and other features described herein can be implemented as discrete hardware components or integrated in the functionality of hardware components such as ASICS, FPGAs, DSPs or similar devices connecting to interconnect 910. In addition, file name based command execution 928 can be implemented as firmware or functional circuitry within hardware devices. Further, file name based command execution 928 can be implemented in any combination hardware devices and software components.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
    periodically examining a predetermined file directory in a storage system to determine if the predetermined file directory contains any file, the predetermined file directory being accessible by users with a predetermined privilege only;
    upon finding a zero-byte first file, determining that a file name of the zero-byte first file includes one or more commands of a plurality of preconfigured file name based commands executable in the storage system, the commands having been embedded in the file name of the first file as stored in the storage system, wherein the file name of the first file has further embedded therein all of one or more parameters to be utilized to execute the embedded one or more commands;

executing the one or more commands included in the file name of the first file to perform one or more actions associated with the one or more commands;

creating a zero-byte second file in the predetermined file directory, indicating that the included one or more commands are being executed; and upon that the included one or more commands finish execution, removing the first file and second file from the predetermined file directory, wherein removal of both the first file and the second file indicates that the included one or more commands have been executed, such that subsequent examination of the predetermined file directory would not find the first file again to prevent the same commands from being executed again.

2. The method of claim 1, further comprising:

receiving a request from a user to create the first file in the predetermined file directory;

determining an access privilege of the user; and responsive to the determining that the access privilege of the user allows the user to create the first file in the predetermined file directory, creating the first file in the predetermined file directory.

3. The method of claim 1, wherein executing the one or more commands included in the file name of the first file comprises:

parsing the file name of the first file;

extracting the one or more commands from the file name;

looking up a data structure to interpret the extracted one or more commands;

performing the one or more actions associated with the one or more commands based on the data structure.

4. The method of claim 1, wherein a result of executing the file name based command included in the file name of the first file is stored in a log file for debugging.

5. The method of claim 1, wherein the plurality of preconfigured file name based commands include commands manipulating a hierarchical data structure storing namespace of a file system of the storage system.

6. The method of claim 5, wherein the file system is available for accessing by clients of the storage system while the plurality of preconfigured file name based commands are being executed.

7. The method of claim 1, wherein the storage system is a deduplicating storage system.

8. A storage system, comprising:

a processor and a non-transitory machine-readable storage medium coupled to the processor, the non-transitory machine-readable storage medium containing instructions executable by the processor, wherein the storage system is operative to:

periodically examine a predetermined file directory in a storage system to determine if the predetermined file directory contains any file, the predetermined file directory being accessible by users with a predetermined privilege only, upon finding a zero-byte first file, determining that a file name of the zero-byte first file includes one or more commands of a plurality of preconfigured file name based commands executable in the storage system, the commands having been embedded in the file name of the first file as stored in the storage system, wherein the file name of the first file has further embedded therein all of one or more parameters to be utilized to execute the embedded one or more commands, execute the one or more commands included in the file name of the first file to perform one or more actions associated with the one or more commands, create a zero-byte second file in the predetermined file directory, indicating that the included one or more commands are being executed, and upon that the included one or more commands finish execution, remove the first and second file from the predetermined file directory, wherein removal of both the first file and the second file indicates that the included one or more commands have been executed, such that subsequent examination of the predetermined file directory would not find the first file again to prevent the same commands from being executed again.

9. The storage system of claim 8, wherein the storage system is further operative to:

receive a request from a user to create the first file in the predetermined file directory, determine an access privilege of the user, and responsive to the determining that the access privilege of the user allows the user to create the first file in the predetermined file directory, create the first file in the predetermined file directory.

10. The storage system of claim 8, wherein execution of the one or more commands included in the file name of the file is to:

parse the file name of the first file, extract the one or more commands from the file name, look up a data structure to interpret the extracted one or more commands, and perform the one or more actions associated with the one or more commands based on the data structure.

11. The storage system of claim 8, wherein the plurality of preconfigured file name based commands include commands manipulating a hierarchical data structure storing namespace of a file system of the storage system.

12. The storage system of claim 8, wherein the file name of the first file is identical to a file name of the second file, except extensions of the first file and the second file.

13. A non-transitory computer-readable storage medium having instructions stored therein, which when executed by a processor, cause the processor to perform operations, the operations comprising:

periodically examining a predetermined file directory in a storage system to determine if the predetermined file directory contains any file, the predetermined file directory being accessible by users with a predetermined privilege only;

upon finding a zero-byte first file, determining that a file name of the zero-byte first file includes one or more commands of a plurality of preconfigured file name based commands executable in the storage system, the commands having been embedded in the file name of the first file as stored in the storage system, wherein the file name of the first file has further embedded therein all of one or more parameters to be utilized to execute the embedded one or more commands;

executing the one or more commands included in the file name of the first file to perform one or more actions associated with the one or more commands;

creating a zero-byte second file in the predetermined file directory, indicating that the included one or more commands are being executed; and upon that the included one or more commands finish execution, removing the first and second file from the predetermined file directory, wherein removal of both the first file and the second file indicates that the included one or more commands have been executed, such that subsequent examination of the predetermined file directory would not find the first file again to prevent the same commands from being executed again.

14. The non-transitory computer-readable storage medium of claim 13, wherein executing the one or more commands included in the file name of the first file comprises:
parsing the file name of the first file;
extracting the one or more commands from the file name;
looking up a data structure to interpret the extracted one or more commands;
performing the one or more actions associated with the one or more commands based on the data structure.

15. The non-transitory computer-readable storage medium of claim 13, wherein a result of executing the file name based command included in the file name of the first file is stored in a log file for debugging.

16. The non-transitory computer-readable storage medium of claim 13, wherein the plurality of preconfigured file name based commands include commands manipulating a hierarchical data structure storing namespace of a file system of the storage system.

* * * * *